Nov. 2, 1926.  
H. F. TOWNER  
1,605,486  
POWER LIFT  
Filed Feb. 9, 1925   2 Sheets-Sheet 1

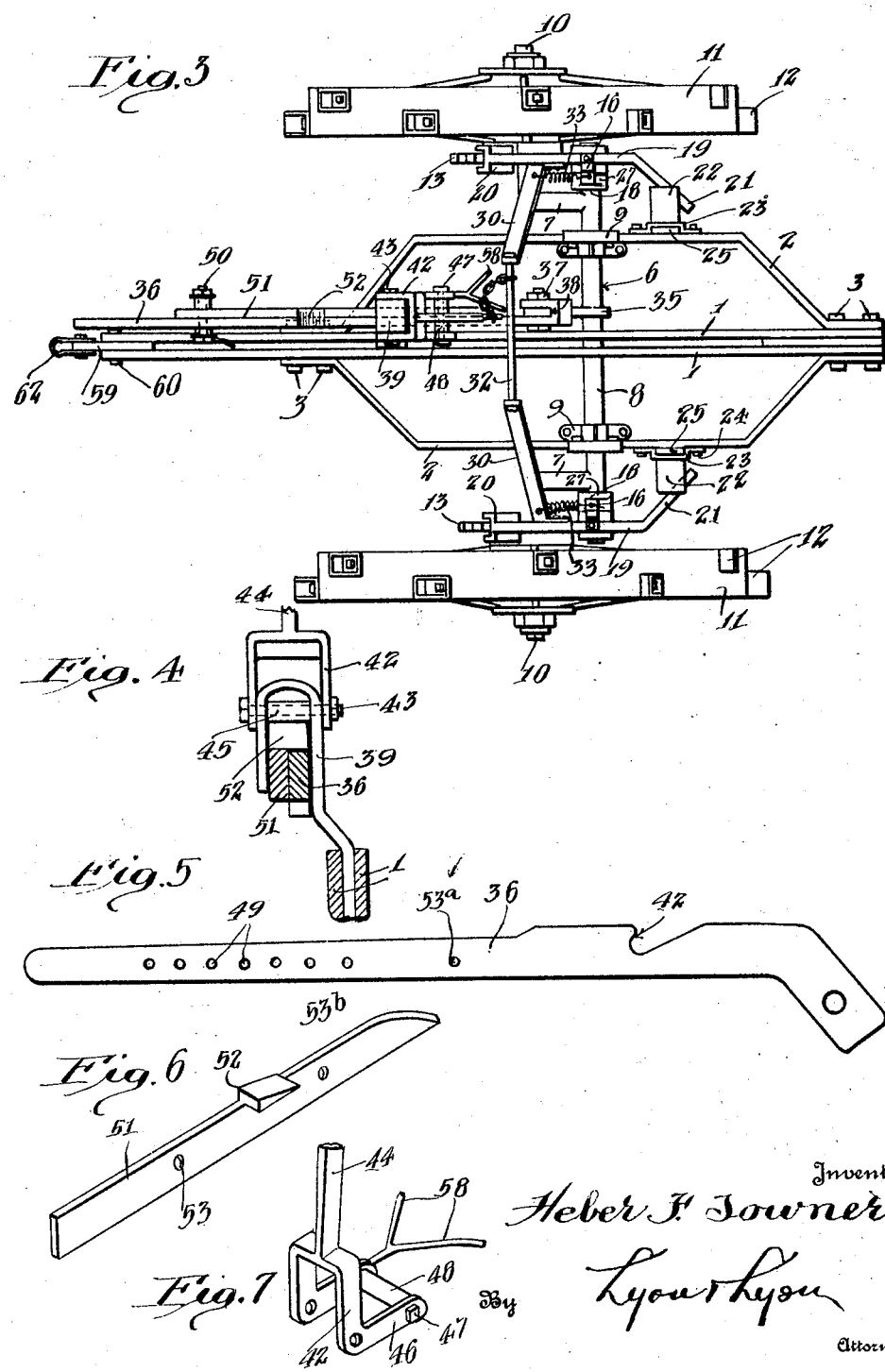

Patented Nov. 2, 1926.

1,605,486

UNITED STATES PATENT OFFICE.

HEBER F. TOWNER, OF SANTA ANA, CALIFORNIA.

POWER LIFT.

Application filed February 9, 1925. Serial No. 7,867.

This invention relates to improvements in power lifts for implements for working in the ground wherein the power or normal draft of the implement is utilized to raise the tools from the ground.

Power lifts are utilized for automatic raising of ground tools in many different types of implements used for agricultural purposes or for highway construction and like purposes.

When the ground tools are raised it is preferable, and in many cases absolutely necessary, that there be provided some sort of a latch or holding means for holding the tools in this elevated position and when the tools are so raised and held in the elevated position, it is essential that some sort of means be provided for effecting an easy release of the holding means to allow the ground tools to fall again to the working position. Many devices have been devised for this purpose and as the tools are usually of very heavy construction, it is essential that the release of the holding means be effected from a point removed from the implement so that the individual releasing the holding means is not in any wise in danger from the fall of the tools.

The general object of this invention is to provide a power lift mechanism having its parts so constructed and organized as to enable the operator to effect, from a distance, an easy lowering of the tools and a positive and effective means whereby the tools are raised through the agency of the normal draft of the implement.

Another object of this invention is to produce a power lift in which means are provided for positively holding the working tools either in the elevated or lowered position so that the tools will of necessity remain in the position desired by the operator, and more particularly stated, to provide a form of power lift in which the working tools are positively held in the lowered or working position at all times during the use of the tools.

Other objects and advantages of this invention will be apparent from the preferred description of the combination and novel parts thereof, all of which contribute to produce an efficient power lift mechanism.

In the drawings:

Fig. 3 is a top plan view thereof.

Fig. 4 is a fragmental end elevation of means provided for holding the working tools in the elevated position.

Fig. 5 is a side elevation of a slide bar as embodied in this invention.

Fig. 6 is a perspective view of means provided in this invention for positively holding the working tools in the lowered position.

Fig. 7 is a perspective view of the trip mechanism and holding means embodied in this invention.

Figure 1:
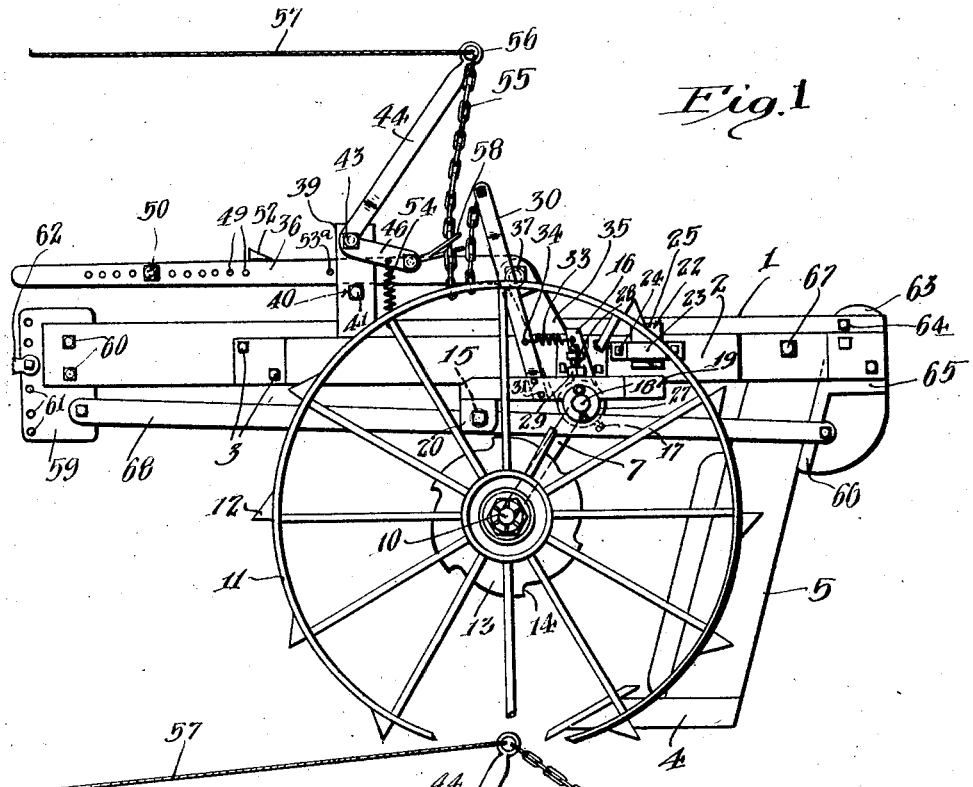
Fig. 1 is a side elevation of an agricultural implement embodying this invention showing the working tools held in the elevated position.

In the preferred embodiment of this invention shown in the drawings, 1 indicates a pair of medial frame members and 2 outer frame members. The members 1 and 2 are secured at their terminal ends by any suitable means, such as the bolts 3. The members 2 are bowed transversely inward to meet the members 1. Dependingly supported on the rear of the frame members 1 and 2 is a ground working tool 4 mounted on the standard 5. Any suitable form of ground working tool 4 may be mounted on the standard 5 or a plurality of ground working tools 4 may be mounted thereon.

A crank axle 6 having crank arms 7 and a medial crank portion 8 is journaled on the medial portion of the members 2 in bearings 9. On the transversely extending necks 10 of the crank axle 6 are journaled ground wheels 11 which ground wheels 11 are of any suitable construction. Bolted to the ground wheels 11 are ground gripping members 12. Rigidly connected to the ground wheels 11 are power wheels 13 having teeth or shoulders 14 which are adapted to engage a pin 15 for raising the ground working tools 4 from the ground, using the pull or normal draft of a tractor or other suitable draft implement, not shown.

Rigidly secured to the crank axle 6 in axial alignment with the crank portion 8 are fixed stud portions 18 of the crank axle 6, which stud portions 18 are preferably horizontal extensions of the crank portion 8.

An arm 19 is loosely mounted on each stud portion 18 and extends forward and rearwardly from each side of the stud portion 18 of the crank axle 6 and carries at its forward end within a bifurcated bracket 20 the pin 15 and is bent inwardly at its rearward end as illustrated at 21 so as to be in position to engage the adjustable plates 22, which plates 22 are mounted within the clamps 23 secured to the frame members 2 by means of bolts as illustrated at 24. Each plate 22 has a vertically extending portion 25 which fits within the bracket 23 and the height of the plate 22 may by this manner of connection be regulated in relation to the arm 19. Mounted on each stud portion 18 of the crank axle 6 is an arm 16 which is formed integral with a ring 27 which is passed over the portion 18 of the crank axle 6 and is free to rotate thereon for adjustment and each arm 16 is provided with a set screw 17 for locking it in the adjusted position. Secured to the arm 16 is a nut 28 in which a bolt 29 is screw threaded and which bolt 29 is held in position to engage the upper surface of the arm 19. By this means the position of the pin 15 in relation to the shoulders 14 of the power wheels 13 may be regulated by turning the bolt 29 so as to either raise or lower the pin 15 thereby changing the angle between the arms 19 and 16. An actuating lever 30 is secured to each arm 19 as illustrated at 31 and the arms 30 are bent inwardly and joined by means of a rod 32. A coil spring 33 is secured at one end of the arm 30 as illustrated at 34 and at its opposite end to the arm 16 so that the arm 30 is normally urged rearwardly so as to maintain the pins 15 out of engagement with the shoulders 14.

Secured to the portion 8 of the crank axle 6 by any suitable means, such as welding, is an arm 35 to the upper end of which arm 35 a slide bar 36 is pivotally secured by means of a pin 37, the rearward end of which slotted bar 36 is bent rearwardly upon itself to form a bracket into which the end of the arm 35 is adapted to fit as illustrated at 38. The slide bar 36 extends forward and is adapted to slide within a bifurcated bracket 39, which bifurcated bracket 39 is mounted on the medial frame members 1. The bar 36 slides on a roller 40 mounted on the pin 41 which pin 41 passes through the bracket 39. A recess 42 formed as a hook, as illustrated in Fig. 7, is cut in the bar 36. Mounted on a pin 43 situated above the pin 41 is an arm 44 which arm 44 has a bifurcated clamping end 42 adapted to fit over the bifurcated bracket 39. Mounted on the pin 43 is a roller 45. The arm 44, after its connection with the pin 43, has a rearwardly extending portion 46 which carries a pin 47 upon which pin 47 a roller 48 is mounted.

When it is desired to hold the ground working tools 4 in the elevated position, the roller 48 is engaged within the hook recess 42 formed in the bar 36. The forward end of the arm 36 is provided with a plurality of bores 49, any one of which bores 49 is adapted to receive a bolt 50 so that the depth of penetration of the ground working tools may be adjusted. The bolt 50, when adjusted in the proper hole 49, engages the forward edge of the bifurcated bracket 39 and prevents further penetration of the ground working tool 4.

Figure 2:
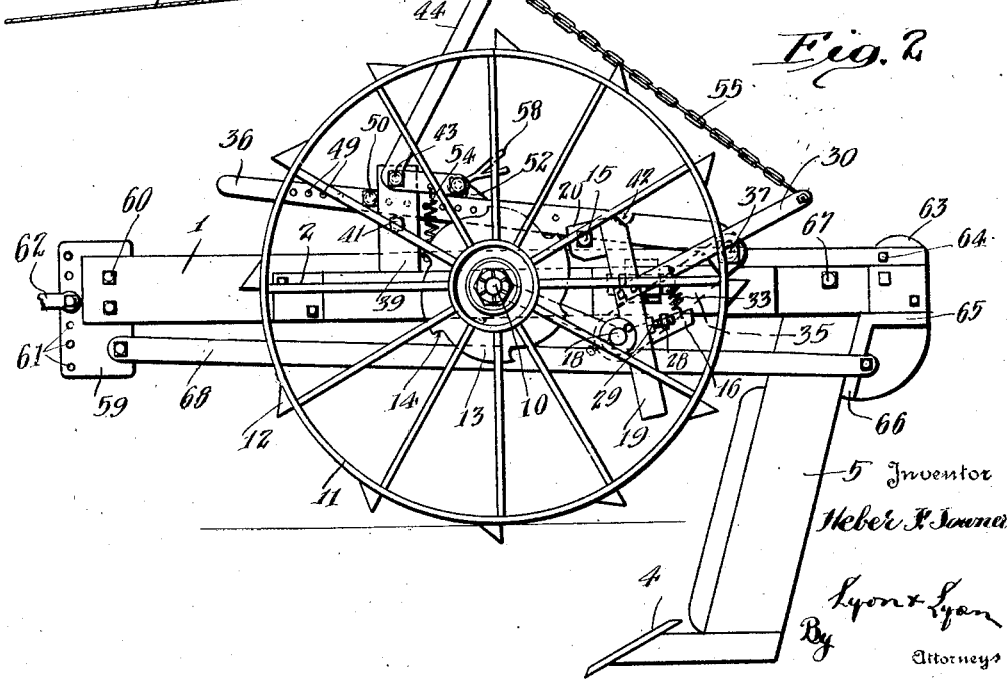
Fig. 2 is a side elevation of an agricultural implement embodying this invention showing the working tools in the lowered or working position.

Means are provided for preventing the raising of the ground working tools 4 when lowered to the position as illustrated in Fig. 2, and comprises a bar 51 upon which an extension 52 is secured or formed and which bar 51 has a bore 53 through which the bolt 50 passes so as to hold the extension 52 spaced to the rear of the bolt 50. The lower edge of the extension 52 rides upon the upper edge of the bar 36 and together with the bolt 50 prevents rotation of the bar 51. The extension 52 is by this means held in position to engage the roller 48 when the ground working tools are lowered to the position illustrated in Fig. 2, and being so engaged prevents the ground working tools 4 from lifting during the working of the ground therewith. A spring 54 is secured to the end of the extension 46 of the arm 44 and to one of the medial frame members 1 and normally urges the roller 48 into engagement with the supper surface of the arm 36 or holds the same within the hook recess 42. Secured to the rod 32 is a chain 55, which chain 55 is secured at its opposite end to the upper end of the arm 44 in a ring 56 to which ring 56 an operating cable or cord 57 is secured. A bifurcated guide 58 is mounted on the pin 47 in position to hold the chain 55 from becoming entangled within the bifurcated bracket 39 or attendant parts.

The medial frame members 1 are extended forward from their connection with the outer frame members 2 and a plate 59 is secured between the members 1 by any suitable means such as the bolt 60. The plate 59 has a plurality of bores 61 any one of which may receive a clevis 62, which clevis 62 is adapted to be connected with the tractor or other draft implement. The medial frame members 1 likewise extend rearwardly from their connection with the outer frame members 2 and are fitted with a member 63 which member 63 is secured to the members 1 by any suitable means such as the bolts 64. The members 63 have a race 65 providing an upper bearing surface to engage the end and sides of the members 1 and a downwardly extending recess 66 for providing abutting surfaces for the upper rearward edge of the standard 5. The standard 5 is pivoted between the medial frame members 1 on a pin 67.

A pair of brace rods 68 are connected at their respective ends to the plates 59 and 63.

The operation of this implement is as follows:

The implement being in the position illustrated in Fig. 1, that is with the ground working tools 4 in the elevated position, when the operator desires to lower the same to cultivate the ground, he exerts a pressure upon the cable 57 which raises the roller 48 from within the recess 42 and permits the bar 36 to slide rearwardly within the bifurcated bracket 39 allowing the crank axle 6 to rotate and lower the ground working tools to the position illustrated in Fig. 2. The implement is then in position to cultivate the ground. The depth of the penetration of the ground working tools 4, is regulated by means of the bolt 50, as hereinbefore described. As the implement is drawn forward, if the same encounters an obstacle which it is not possible to draw the ground working tools 4 through, or which for some reason it is desired to draw the ground working tools 4 through, the implement is backed, which backing allows the standard 5 to swing forward and in many of these cases it may be desirable to elevate the ground working tools 4 from the ground whereupon the operator, from the seat of the draft implement, again pulls the cord 57 which operates through the chain 55 to rotate the actuating lever 30 to engage the pin 15 with the shoulders 14. As the implement is drawn over the ground, the rotation of the ground wheels 11 on the crank axle 6 elevates the ground working tools 4 to the position illustrated in Fig. 1, at which time the rearward end 21 of the arm 19 engages the plates 22 and as the implement continues its forward motion, the pins 15 are withdrawn from engagement with the shoulders 14 and the spring 54 pulls the roller 48 down into the recess 42 and holds the implement in the elevated position.

The elevation of the tools, or the position at which it is desired that the roller 48 should be engaged with the recess 42, is regulated by means of the bolt 29 so that the moment at which the roller 15 elevates the shoulders 48 is fixed, as in the manner heretofore described.

During the transportation of the implement it is preferable that means be provided for positively holding the ground working tool 4 elevated so that there is no danger of the tool falling and breaking the point causing other damage. For this purpose holes 53ª and 53ᵇ are formed in the bar 51 and the slide bar 36 in position to align when the bar 51 is properly positioned and a bolt is passed through these holes to engage the edge of the bifurcated bracket 39.

Having fully described the preferred embodiment of this invention, it is understood that I do not wish to be limited to the exact description as herein set forth, but various modifications may be made without departing from the spirit of the invention, and the invention is of the scope set forth in the appended claims.

I claim:

1. In an implement of the class described, the combination of a frame, a crank axle journaled in bearings transversely of the frame, wheels journaled on the axle, a ground working tool supported by the frame, means for rocking the crank axle, a standard secured to the frame, an arm pivotally supported by the standard, said arm having a portion bent rearwardly to form an angle with the arm, a roller carried by the said portion, a slide bar, an arm connecting the slide bar with the crank axle, a hooked recess formed in the slide bar in which the said roller is adapted to fit, and means secured to the opposite end of the said arm for rotating the arm on its pivot to release the roller from the said recess so as to permit the ground working tool to fall.

2. In an implement of the class described, the combination of a frame, a crank axle journaled in bearings transversely of the frame, ground wheels journaled on the axle, a ground working tool supported by the frame, an arm pivotally supported to a standard on the frame, the arm having a portion bent rearwardly, and a roller carried by the rearward bent portion in position to fit within a recess formed in a slide bar to hold the ground working tool in elevated position, and means for rotating the arm on its pivot to release the roller from the said recess to permit the ground working tool to fall.

3. In an implement of the class described, the combination of a frame, a crank axle journaled in bearings transversely of the frame, ground wheels journaled on the axle, a ground working tool supported by the frame, a ratchet wheel secured to each ground wheel, a pin carried by an arm secured to a stud portion of the crank axle in position to be moved into engagement with the teeth formed on the ratchet wheels, means for adjusting the angle of the arm relative to the arm of the crank axle, and means for releasing the pins from engagement with the ratchet wheels at a predetermined point of rotation of the crank axle.

4. In an implement of the class described, the combination of a frame, a crank axle journaled in bearings transversely of the frame, ground wheels journaled on the axle, a ground working tool supported by the frame, a sliding bar pivotally secured to an arm mounted on the crank axle, a standard mounted on the frame, means adjustably secured to the sliding bar and adapted to engage the standard, and an abutment carried by the sliding bar and adjustable with the said adjustable means for engagement with a roller pivotally supported by the standard to hold the ground working tool in the lowered position.

5. In an implement of the class described, the combination of a frame, a crank axle journaled in bearings transversely of the frame, ground wheels journaled on the axle, a ground working tool supported by the frame, a ratchet wheel secured to a ground wheel, an arm adjustably secured to a stud portion of the crank axle, a pin carried by the arm in position to be engaged with the ratchet wheel, an actuating arm secured to the pin carrying arm, a slide bar, a recess formed in the slide bar, a standard mounted on the frame, a pin supported by the standard and adapted to be engaged within the recess formed in the slide bar, an arm for pivotally securing the slide bar to the crank axle, means for releasing the pin from engagement within the recess for permitting the frame to fall, and a flexible connection between the actuating arm and the pin releasing means, so that either the raising or releasing means may be actuated from a common flexible connection extending forward from the implement.

Signed at Los Angeles California this 30th day of January 1925.

HEBER F. TOWNER.